(12) United States Patent
Dalal et al.

(10) Patent No.: US 8,280,161 B2
(45) Date of Patent: Oct. 2, 2012

(54) SPOT COLOR TABLE COMPENSATION

(75) Inventors: Edul N. Dalal, Webster, NY (US);
Wencheng Wu, Webster, NY (US)

(73) Assignee: Xerox Corporation, Norwalk, CT (US)

(*) Notice: Subject to any disclaimer, the term of this patent is extended or adjusted under 35 U.S.C. 154(b) by 924 days.

(21) Appl. No.: 12/358,806

(22) Filed: Jan. 23, 2009

(65) Prior Publication Data
US 2010/0189348 A1 Jul. 29, 2010

(51) Int. Cl.
*G06K 9/00* (2006.01)
(52) U.S. Cl. .......... 382/167; 382/165; 382/274; 358/1.9
(58) Field of Classification Search ................. 382/162, 382/165, 167, 274; 358/1.9, 518, 520, 534; 345/690
See application file for complete search history.

(56) References Cited

U.S. PATENT DOCUMENTS

| | | | |
|---|---|---|---|
| 6,262,810 B1 * | 7/2001 | Bloomer | 358/1.9 |
| 7,295,215 B2 | 11/2007 | Klassen | |
| 7,791,776 B2 * | 9/2010 | Nielsen et al. | 358/518 |
| 2009/0087090 A1 * | 4/2009 | Gregory et al. | 382/167 |

* cited by examiner

*Primary Examiner* — Ali Bayat
(74) *Attorney, Agent, or Firm* — Fay Sharpe LLP (57) ABSTRACT

Spot color tables, or spot color emulation colorant recipes are updated using information generated during a first and second process color related system calibration. Rather than separately calibrate, through trial and error, individual spot color emulation colorant recipes, information from the first and second general system calibrations is used to adjust spot color recipes. In one embodiment, processing an existing or initial spot color recipe through both a first system model and a second system model generates a device independent color difference. A colorant difference is then determined by transforming a predicted color difference according to estimated partial derivatives of aspects of the second system model, wherein the partial derivatives relate changes in colorant amounts to changes in parameter values of a machine independent color space.

18 Claims, 6 Drawing Sheets

SPOT COLOR TABLE COMPENSATION

BACKGROUND

Presently disclosed embodiments are directed toward methods and systems for compensating spot color emulation colorant recipes for changes in performance, or drifts, in an associated color producing system or process.

In color producing systems or processes, such as, color printers, copiers, display devices, and the like, most requests for the production of colors are processed through a system profile. For example, the system profile includes a calibration curve or curves for transforming color descriptions of requested colors into colorant recipes based on the performance of the color producing system at the time of the system's most recent calibration. For instance, the system profile may provide information for transforming a requested color description in terms of an industry standard machine independent color space, such as that known as CIE1976 (L*a*b*) or CIELAB (of the Commission Internationale d'Eclairage), which describe color in terms of 3 parameters, known as L*, a*, b*, into colorant amounts. For example, many color producing systems produce colors by applying varying amounts of cyan, magenta, yellow and black colorants (e.g., inks or toners) to a print medium (e.g., vellum or paper). Other color producing systems may employ additional colorants, such as orange, green, violet, light cyan, light magenta, and/or grey. Some color producing systems (e.g., display devices) produce colors by presenting various intensities of colored light (commonly red, green and blue). Colors produced through this transformation process are referred to as "process colors".

Generally, imperfections in the system profile, which may lead to small errors in the accuracy of the rendered color, are tolerable in the rendering of process colors.

Colors which are of particular importance to document or image authors are referred to as "spot colors". Spot colors can include colors associated with a company's logo, trademark or trade dress. Additionally, spot colors may be used when color accuracy is particularly important, such as when printing catalogs of clothing or decorative items or paint color selection guides.

Color producing systems that support the emulation of spot colors often include spot color tables, which associate spot colors, either by name or identification information, with a colorant recipe. Additionally, spot colors can be defined by parameter values in one or more industry standard machine independent color space (e.g., L*, a*, b*).

Traditionally, spot color tables have been generated manually through a process of trial, visual evaluation and adjustment. Since there are many spot colors in a table (over 1,000 in some cases), the generation and updating of a spot color table can be time consuming and expensive.

Recently, the inclusion of inline (in situ) spectrophotometers in high-end color producing systems has allowed the creation and maintenance of spot color tables to be at least semi-automated. However, the iterative trial and error process can still consume many sheets of print media, inks and/or toners (where the color producing system involves printing) as well as time.

Color producing systems can drift with time. Display elements age and change in efficiency. The characteristics of toners and inks vary with manufacture, production lot, time, temperature, humidity and age. Accordingly, a spot color table prepared at a first point in time can prove to be inaccurate if used to produce spot colors at a second point in time. Spot color tables can be updated by recalibration at such a second point in time. However, as indicated above, such recalibrations are time consuming and wasteful of material.

Therefore, there is a need for methods and systems for updating or compensating spot color tables for drift in associated color producing systems that minimize the use of consumables and time devoted to the compensating or updating process.

BRIEF DESCRIPTION

A method for compensating a spot color emulation colorant recipe for emulating a spot color in output of an associated color producing system for changes in the associated color producing system, can include determining an initial spot color emulation colorant recipe at a first point in time, determining a first system model for the associated color producing system, wherein the first system model relates colorant recipes to values in the device independent color space according to the operation of the color producing system at the first point in time, determining a second system model for the associated color producing system, wherein the second system model relates colorant recipes to values in the device independent color space according to the operation of the color producing system at a second point in time, processing at least one of the spot color definition and the initial spot color emulation colorant recipe according to information included in, or generated from, both the first system model and the second system model, thereby generating a compensated spot color emulation recipe; and using the compensated spot color emulation colorant recipe to render an emulation of the spot color.

A spot color recipe compensation system that operates to compensate a spot color emulation colorant recipe for emulating a spot color in output of an associated color producing system can include a spot color recipe determiner, a system model determiner, and a spot color information processor. For example the spot color recipe determiner can operate to determine the initial spot color emulation colorant recipe at a first point in time.

The system model determiner can operate to determine a first system model for the associated color producing system, wherein the first system model relates colorant recipes to values in the device independent color space according to the operation of the color producing system at the first point in time and operates to determine a second system model for the associated color producing system, wherein the second system model relates colorant recipes to values in the device independent color space according to the operation of the color producing system at a second point in time. These models may be determined as part of ordinary operation of the color producing process. For example, they may be determined in order to calibrate the system for the production of ordinary process colors.

The spot color information processor can operate to process at least one of the spot color definition and the initial spot color emulation colorant recipe according to information included in, or generated from, both the first system model and the second system model, thereby generating a compensated spot color emulation recipe.

For instance, the system may be associated with a rendering device of the color producing process that operates to use the compensated spot color emulation colorant recipe to render an emulation of the spot color.

DETAILED DESCRIPTION

Figure 1:
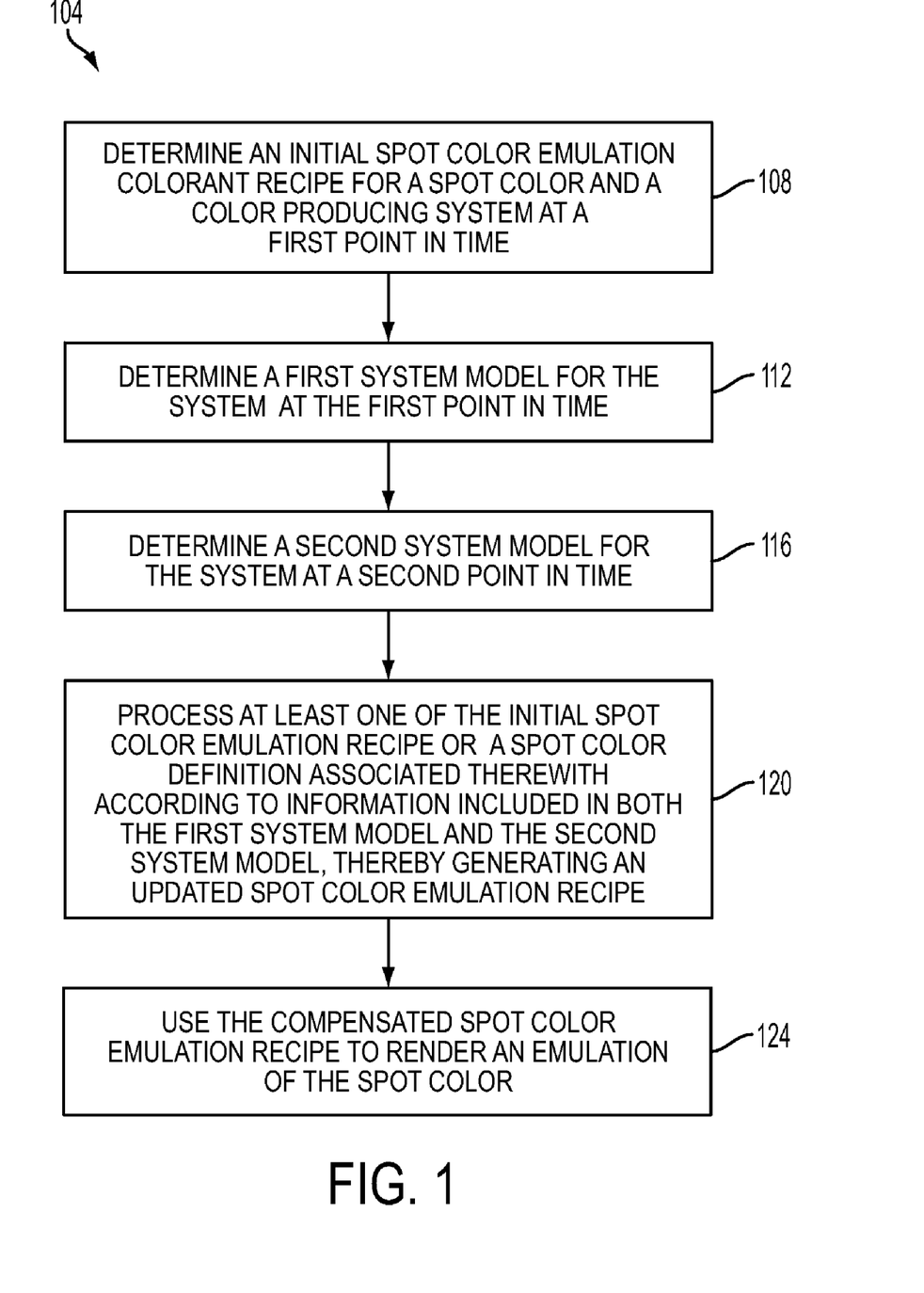
FIG. 1 is a flow chart outlining a method of compensating a spot color emulation colorant recipe for changes in an associated color producing process.

A method 104 for compensating a spot color emulation colorant recipe for emulating a spot color in output of an associated color producing system, the spot color being associated with at least one of a spot color definition in terms of a machine independent color space and an initial spot color emulation colorant recipe in terms of a machine dependent color space of the color producing system can include: determining 108 the initial spot color emulation colorant recipe at a first point in time, determining 112 a first system model for the system at the first point in time, determining 116 a second system model for the system at a second point in time, processing 120 at least one of the initial spot color emulation recipe or a spot color definition associated therewith according to information included in both the first system model and the second system model, thereby generating an updated spot color emulation recipe which can be used 124 to render an emulation of the spot color.

As indicated above, spot color tables can be updated by labor and/or material intensive recalibration procedures. However, system models are ordinarily determined 112, 116 on a regular or as needed basis and, according to the embodiments disclosed herein, information from those recalibrations 112, 116 can be used 120 to determine corrections for the spot color table. In effect, the calibrations are compared and the trend in the drift or system change is determined and a compensating adjustment is applied to the spot color recipes. Since the trend in system drift can be different at different points in color space (e.g., blues may have drifted toward the red while yellows may have drifted toward the green), the trend in system change can be determined at local points within the color space or gamut of the color producing system at or near each spot color of interest.

Referring again to FIG. 1, determining 108 the initial spot color emulation recipe for the spot color and the color producing system at the first point in time can include performing a manual or automatic spot color calibration such as described above, at or near the first point in time. Additionally, or alternatively, determining 108 the initial spot color emulation colorant recipe can include a spot color table lookup wherein a previously stored recipe is accessed based on a selected spot color identifier or as part of a sequential spot color table updating or compensation process. The accessed recipe can serve as a starting point for the spot color calibration Determining 112 the first system model can include determining 112 a first system model that relates colorant recipes to values in the device independent color space according to the operation of the color producing system at the first point in time. Determining 112 the first system model can include performing a standard system calibration at or near the first point in time to determine a first system or destination profile for the system. As indicated above, this determination 112 does not necessarily represent any extra effort. That is, color producing systems are calibrated in this manner on a regular or as needed basis for the purpose of properly transforming or rendering process colors.

For example, calibration patches are rendered according to known or selected colorant recipes. The patches are then measured. For example, a spectrophotometer measures light reflected from the patches and generates readings in terms of parameters of a machine independent color space (e.g., $L*a*b*$). The readings or measurements, or the output of models fitted to the readings or measurements are stored in association with the known or selected colorant recipes and form the basis of a system model of the color producing system at the first point in time or time of the calibration.

As will be discussed below, mathematical techniques can be applied to this model in order to invert it to generate a system profile that relates values in the device independent color space to colorant recipes (according to the operation of the color producing system at the first point in time). Accordingly, the first system profile may be determined 112 from an inversion of a first system model.

Determining 116 the second system model for the system at a second point in time can proceed much as the determination 112 of the system model at the first point in time. However, the determination 116 is made at the second point in time and therefore, the second system model relates colorant recipes to values in the device independent color space according to the operation of the color producing system at the second point in time. The second point in time may be a point in time associated with a routine or scheduled recalibration, at a point in time wherein a drift outside an acceptable performance range has been noted or where a job requiring particularly accurate color reproduction is about to be performed or processed.

Processing 120 the initial spot color emulation recipe or a spot color definition associated therewith according to information included in both the first and second system models can be carried out in a wide variety of ways.

Figure 2:
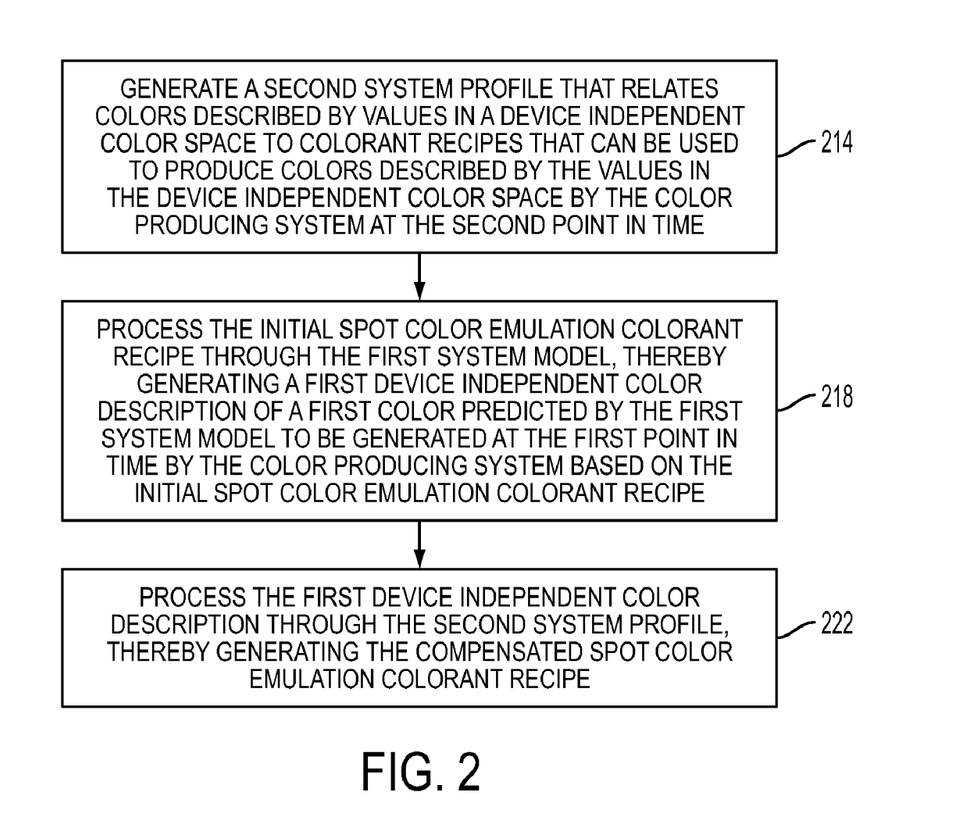
FIG. 2 is a flow chart outlining a first method of processing at least one of an initial spot color emulation colorant recipe and a spot color definition according to information included in both a first system model and a second system model, as called for in the method of FIG. 1.

For example, referring to FIG. 2, one embodiment, which is particularly useful where the spot color is a custom color, a recipe for which has been manually selected by a system operator or for which a system operator has manually adjusted a recipe and which may no longer exactly correspond to an industry or manufacturer standard definition, involves generating 214 a second system profile that relates color described by values in a device independent color space to colorant recipes that can be used to produce colors described by the values in the device independent color space by the color producing system at the second point in time, processing 218 the initial spot color emulation colorant recipe through the first determined 112 system model, thereby generating a first device independent color description of a first color predicted by the first system model to be generated at the first point in time by the color producing system based on the initial spot color emulation recipe and processing 222 this first device independent color description through the generated 214 second system profile, thereby generating the compensated spot color emulation colorant recipe.

The generation 214 of the second system profile may be achieved through a mathematical inversion of the determined 116 second system model.

In many embodiments, there will be more parameters describing a colorant recipe than there are parameters in the machine independent color space. For example, in many embodiments four or more colorants (e.g., cyan, magenta, yellow and black) used in colorant recipes while there are only three (e.g., L*, a*, b*) parameters used to describe colors in the machine independent color space. Any four or more colorant parameters will describe only one color. However, the inverse is not necessarily true. Any particular color (L* a* b* parameter value set) might be achieved by a number of different combinations of colorants. Therefore, an inversion of a system model might have more than one solution. Accordingly, techniques for constraining or selecting the solution to the most appropriate solution can be applied to an inversion process to generate 214 the second system profile, if such an inversion is necessary. If such an inversion is necessary, it can be desirable to select the same constraints or colorant selection rules for the inversion as were applied in determining 108 the initial spot color emulation colorant recipe.

For example, it might be best to apply the same gray component replacement (GCR) or under color removal (UCR) strategy used in determining 108 the initial colorant recipe. In many instances, such a strategy can be determined from an analysis of the ratios of colorants present in the initial spot color emulation colorant recipe.

Processing 218 the initial spot color emulation colorant recipe through the first system model can mean using the parameter values or colorant amounts of the recipe as an index into a multi-dimensional look up table to access an appropriate, previously stored, predicted color. Alternatively, where the parameter values do not exactly correspond to index values of such a look up table, color descriptions associated with colorant values or amounts that are relatively close to the values in the initial recipe may be accessed and various forms of interpolation can be used to generate the first device independent color description.

In still other embodiments, wherein the first system model is stored in the form of offsets and coefficients associated with a polynomial expression of the model, processing 218 the initial spot color emulation colorant recipe can include using the polynomial coefficients, offsets and recipe parameter values to calculate the first device independent color description. As indicated above, the first device independent color description would be in terms of the device independent color space (e.g., L*, a*, b*).

Processing 222 the first device independent color description through the second system profile can proceed in a manner similar to the processing 218 of the initial spot color emulation colorant recipe. That is, the parameter values can be used as an index into a look up table to directly access a colorant recipe. Alternatively, interpolation techniques can be applied based on the parameter values of the first device independent color description, their relationship to valid index values associated with the look up table and colorant recipes associated with those valid index values. Alternatively, if the second system profile is available in the form of offsets and coefficients of a transformation polynomial, then the compensated spot color emulation colorant recipe can be calculated by processing the parameter values of the first device independent color description according to that polynomial and the associated coefficients and offsets.

The second system profile is generated 214 based on an inversion of the determined 116 second system model, so the generated 214 second system profile includes or is representative of information included in the second system model. Accordingly, the method of processing 120 the initial spot color emulation recipe discussed above (i.e., 214, 218, 222) processes 120 at least one of the initial spot color emulation recipe or a spot color definition associated therewith according to information included in both the first system model and the second system model.

The first system model predicts or estimates the color produced by the color producing process based on a particular colorant recipe as the system was operating at the first point in time. The second system profile identifies a colorant recipe for achieving the production of a particular color via the color producing process or system as it is operating at the second point in time. Accordingly, the above-described embodiment (214, 218, 222) first predicts a color to be produced by the initial spot color recipe at the first point in time and then asks how to achieve that color according to the characteristics of the color producing system at the second point in time. If there are errors in the first system model with regard to predicting colors produced by the color producing system near (in color space) the spot color of interest, it is likely that similar errors having an opposite or canceling effect are included in the second system profile. Accordingly, processing 218 the initial spot color emulation colorant recipe through the first system model and then processing 222 the output of that model through the second system profile compensates for errors in the model/profile and generates an appropriate compensated spot color emulation colorant recipe.

If a system profile is based on a first strategy and spot color emulation recipes are based on one or more other strategies, then an updated spot color emulation colorant recipe determined as described above (214-222) may be based on an inappropriate strategy and result in the production of the same color but the produced color may differ from that of an appropriate recipe in other important characteristics such as graininess, mottle, metamerism, cost, or others when used in a rendered image.

Figure 3:
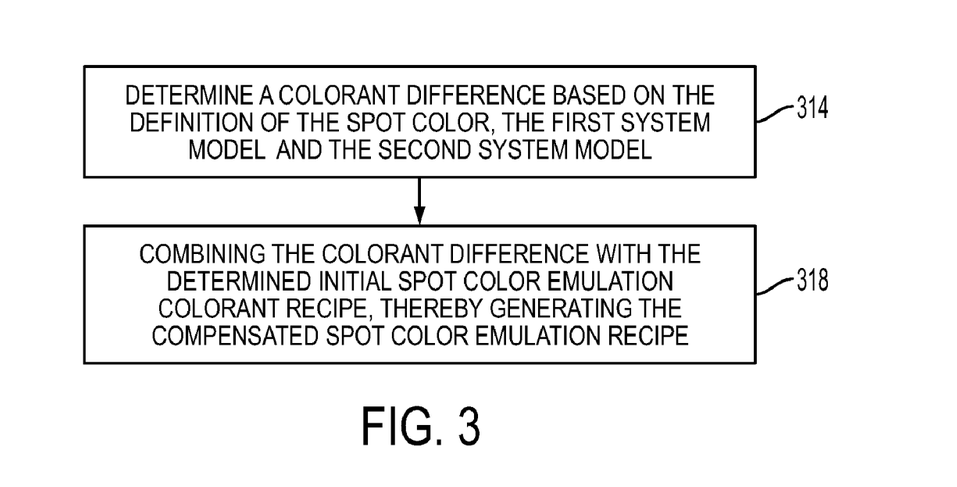
FIG. 3 is a flow chart outlining a second method of processing at least one of an initial spot color emulation colorant recipe and a spot color definition according to information included in both a first system model and a second system model, as called for in the method of FIG. 1.

Referring to FIG. 3, in some embodiments, processing 120 at least one of the initial spot color emulation recipe or a spot color definition associated therewith includes determining 314 a colorant difference based on the definition of the spot color, the first system model and the second system model and combining 318 that determined 314 colorant difference with the determined 108 initial spot color emulation colorant recipe, thereby generating the compensated spot color emulation recipe.

Figure 4:
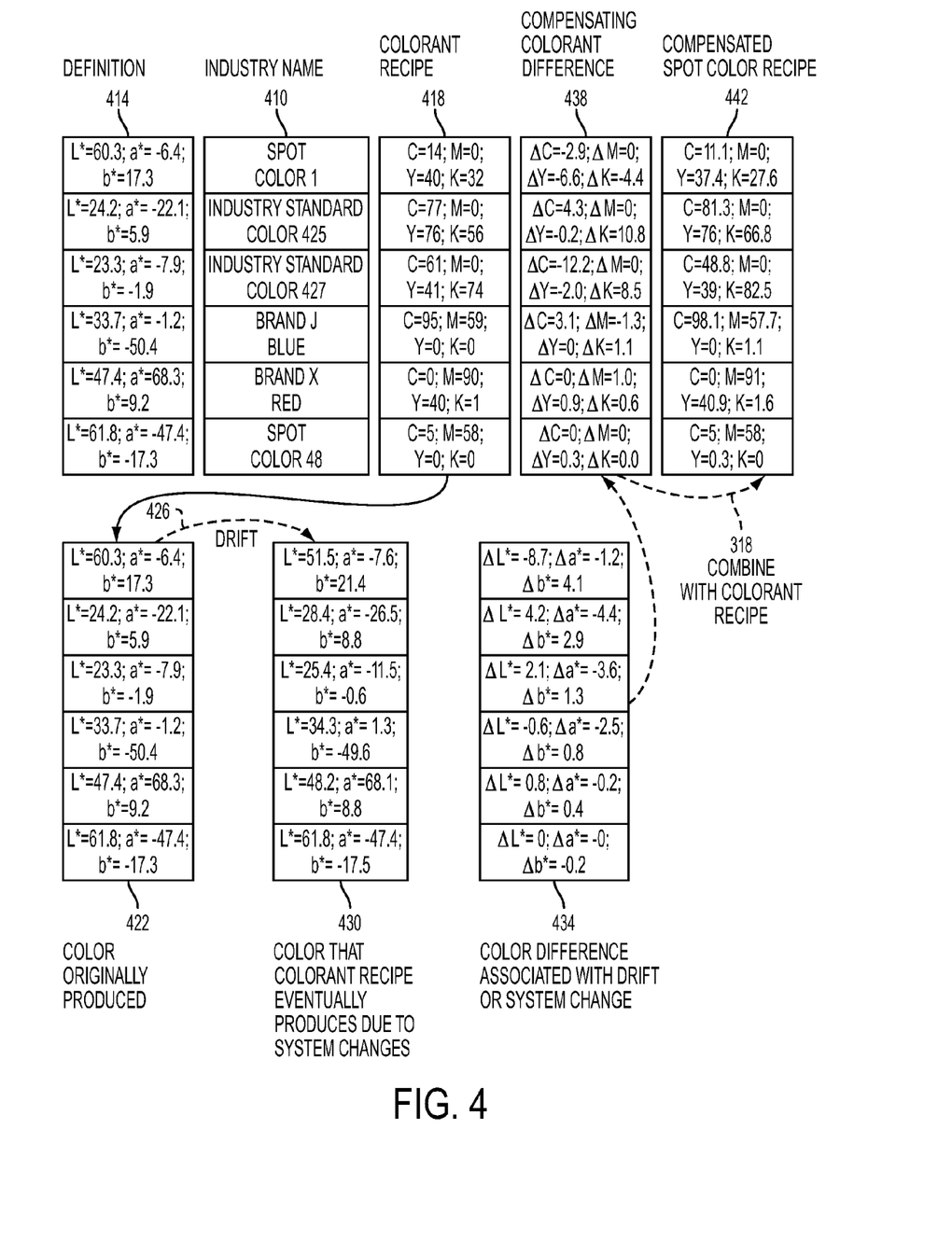
FIG. 4 is a diagram depicting illustrative spot color table related information.

Aspects of such embodiments are depicted in FIG. 4. Spot colors 410 are optionally associated with spot color definitions 414 and are associated with initial colorant recipes 418. Ideally, and as depicted in FIG. 4, the associated color producing process or system originally produces colors 422 that agree with the spot color definitions 414 when applying colorants according to the initial colorant recipes 418. However, as represented by drift 426, attributable to time, system wear, temperature, humidity and other factors, which may include replenishment of inks or toners from different production lots or manufacturers, eventually, the color producing system or process may produce erroneous colors 430 when applying the initial colorant recipes 418. These erroneous colors 430 are associated with color differences 434 or errors in color from the originally produced colors 422 or color definitions 414. The embodiments depicted in FIG. 3 determine 314 colorant differences 438 which can be combined 318 with the initial spot colorant recipes 418, thereby generating compensated spot color recipes 422 which can be used at the second point in time by the color producing system or process to render 124 emulations of the spot colors 410 that are closer to the spot color definitions 414 or originally produced spot colors 422 than are the erroneous colors 430.

Determining 314 the colorant difference based on the definition of the spot color (e.g., 414) and the determined (112, 116) first system model and second system model can be achieved in a number of ways.

Figure 5:
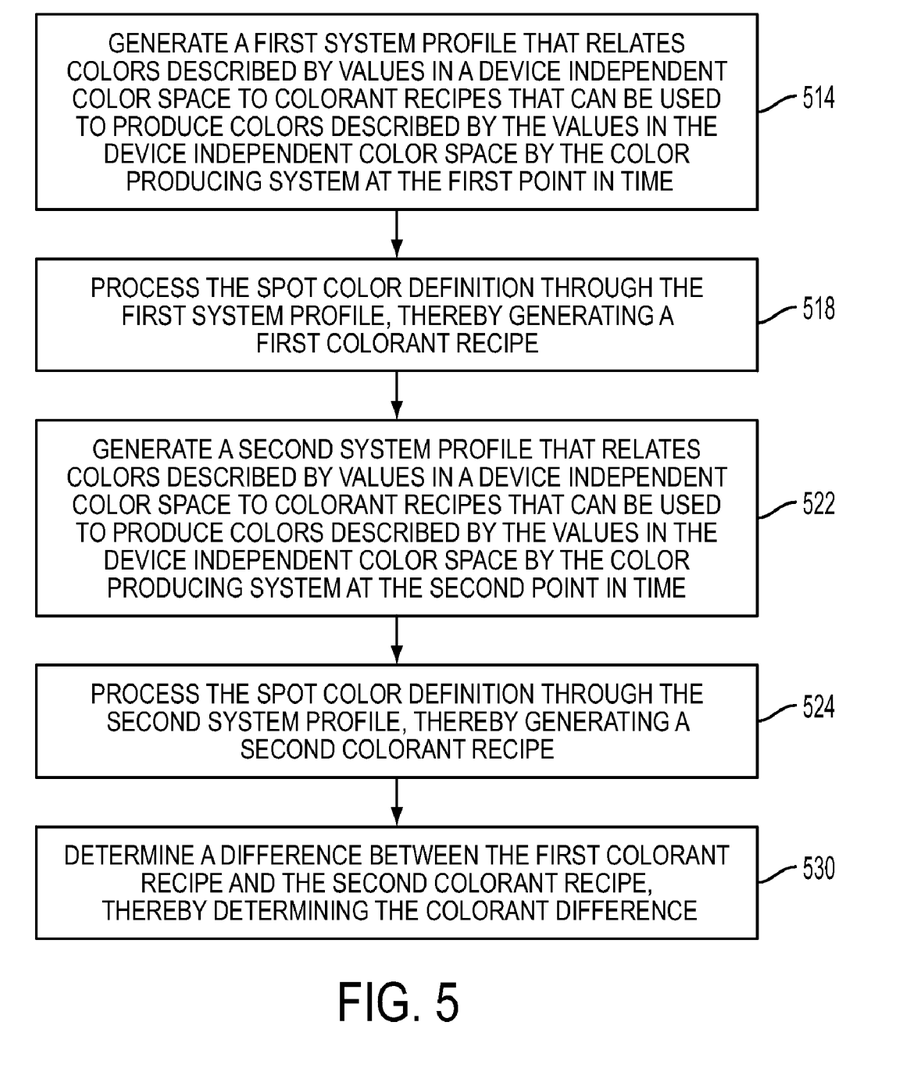
FIG. 5 is a flow chart of a first method for determining a colorant difference, as is called for in the method of FIG. 3.

For example, referring to FIG. 5, determining 314 the colorant difference can be achieved by generating 514 a first system profile that relates colors described by values in the device independent color space to colorant recipes that can be used to produce colors described by the values in the device independent color space by the color producing system at the first point in time, processing 518 the spot color definition (e.g., 414) through the first system profile, thereby generating a first colorant recipe, generating 522 a second system profile that relates colors described by values in the device independent color space to colorant recipes that can be used to produce colors described by the values in the device independent color space by the color producing system at the second point in time, processing 524 the spot color definition (e.g., 414) through the second system profile, thereby generating a second colorant recipe and determining 530 a difference between the first colorant recipe and the second colorant recipe, thereby determining the compensating colorant difference (e.g., 438).

The first and second system profiles can be generated 514, 522 by inverting the determined 112, 116 first and second system models as was described above with reference to generating 214 the second system profile of the earlier described embodiment. That is, the same constraints as those used in determining 108 the initial spot color recipe can be used to select or determine an appropriate inversion from potential pluralities of inversions of the respective system models.

Also as described above, processing 518, 524 the spot color definition through the respective first and second system profiles can include using the parameters of the spot color definition as indices into respective look up tables, as input into an interpolation algorithm where look up tables don't include indices or colorant recipes directly corresponding to the particular values of the spot color definition or as input into a polynomial or other parameterization of the system profiles.

The difference between the first colorant recipe and the second colorant recipe can be determined 530 by simply subtracting corresponding parameter values of the respective recipes from one another.

If a system profile is based on a first strategy and spot color emulation recipes are based on one or more significantly different strategies, then a colorant difference determined 530 as described above (514-530) may produce an incorrect color.

Methods to determine 314 the colorant difference that are more likely to be compatible with the strategy used to generate the initial spot color emulation recipe, take a less direct approach to determining 314 the colorant difference.

Figure 6:
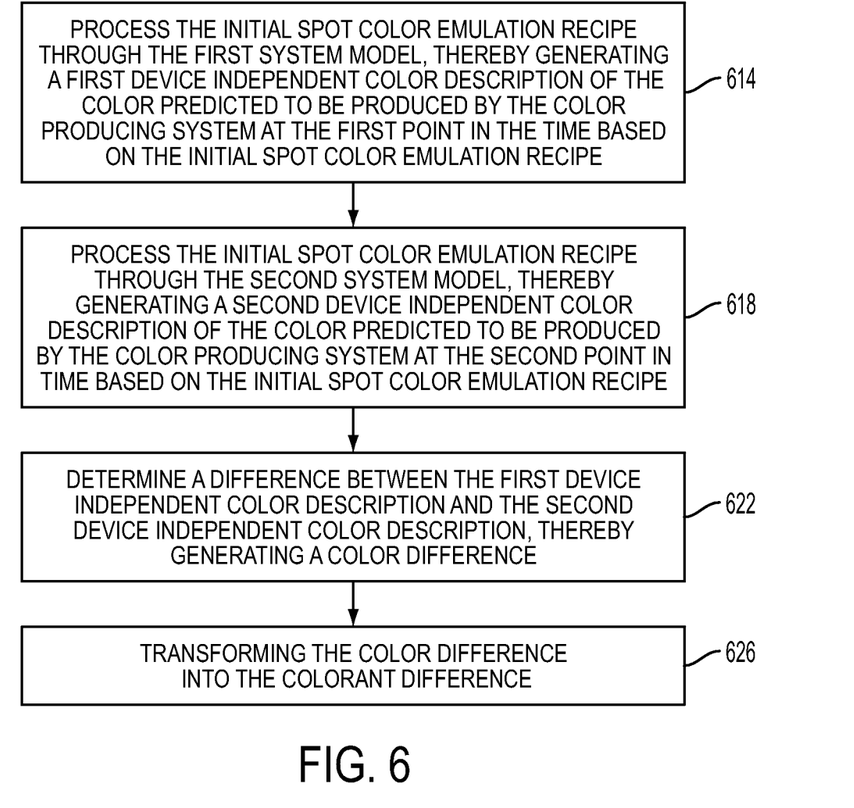
FIG. 6 is a flow chart of a second method for determining a colorant difference, as is called for in the method of FIG. 3.

For instance, referring to FIG. 6, in some embodiments determining 314 a colorant difference based on the definition of the spot color, the first system model and the second system model include processing 614 the initial spot color emulation recipe through the first system model, thereby generating a first device independent color description of the color predicted to be produced by the color producing system at the first point in time based on the initial spot color emulation recipe, processing 618 the initial spot color emulation recipe through the second system model, thereby generating a second device independent color description of the color predicted to be produced by the color producing system at the second point in time based on the initial spot color emulation recipe, determining 622 a difference between the first device independent color description and the second device independent color description, thereby generating a color difference and transforming 626 the color difference into the colorant difference that is to be combined 318 with the initial spot color emulation colorant recipe.

Processing 614 the initial spot color emulation colorant recipe through the first system model can include using the parameter values or colorant amounts of the recipe as an index into a multi-dimensional look up table to access an appropriate, previously stored predicted color. Alternatively, where the parameter values do not exactly correspond to index values of such a look up table, color descriptions associated with colorant values or amounts that are relatively close to the values in the initial recipe may be accessed and various forms of interpolation can be used to generate the first device independent color description.

In other embodiments, wherein the first system model is stored in the form of offsets and coefficients associated with a polynomial expression of the model, processing 614 the initial spot color emulation colorant recipe through the first system model can include using the polynomial coefficients, offsets in combination with the recipe parameter values to calculate the first device independent color description.

Processing 618 the initial spot color emulation recipe through the second system model can proceed in a similar manner, with recipe parameter values being used in a calculation associated with polynomial coefficients and offsets of the second system model or as indices into a multi-dimensional look up table to either directly access a second device independent color description or to access information to be used in an interpolation procedure.

The transformation 626 of the color difference into the colorant difference can be further based on information included in the system models.

Figure 7:
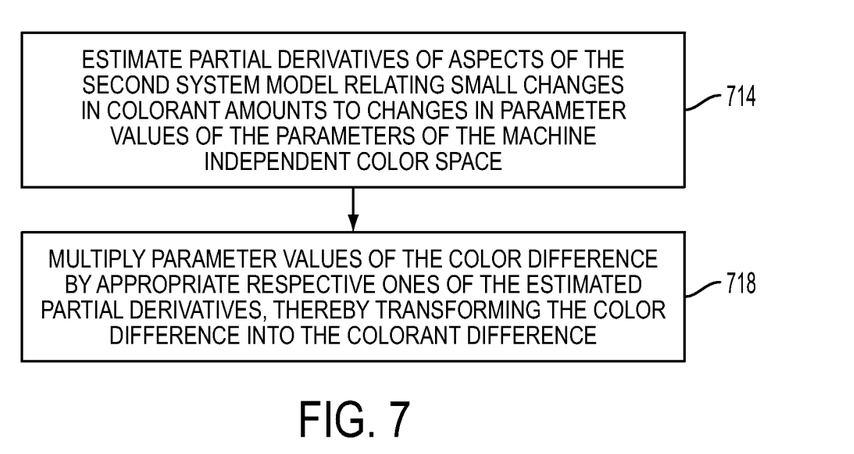
FIG. 7 is a flow chart of a method for transforming a color difference into a colorant difference, as is called for in the method of FIG. 6.

For example, referring to FIG. 7, transforming 626 the color difference into the colorant difference can include estimating 714 partial derivatives obtained from or based on the second system model, the estimated partial derivatives relating small changes in colorant amounts to changes in parameter values of the parameters of the machine independent color space and multiplying 718 respective parameter values of the color difference by appropriate respective ones of the estimated partial derivatives, thereby transforming the color difference into the colorant difference.

More particularly, the estimating 714 can be of partial derivatives of respective colorants with respect to selected parameter values of parameters in the machine independent color space, the partial derivatives being obtained through use of the second system model at and near a point in colorant space associated with the initial spot color emulation colorant recipe. The partial derivatives describe small changes in respective colorant amounts required to produce related changes in the selected parameter values, assuming all other parameters of the machine independent color space are kept constant. The partial derivatives describe this relationship according to the operation of the color producing system as characterized by the second model.

For instance, estimates 714 of the partial derivates referred to above can be obtained from the second system model by applying the second system model to a plurality of colorant recipes that represent small variations from the initial colorant recipe. For example, processing an initial spot color emulation colorant recipe denoted as $c_0$, $m_0$, $y_0$, $k_0$ through the second system model may generate a color description represented by machine independent color description parameter values $L_0$, $a_0$, $b_0$. The second model may be further exercised by processing recipes similar to $c_0$, $m_0$, $y_0$, $k_0$ to determine how small changes in that recipe cause changes in the parameters of the machine independent color description. One example of how this may be done is by changing $c_0$ to $c_0+\Delta c$, keeping $m_0$, $y_0$, and $k_0$ constant, and noting the change in color $\Delta L$, $\Delta a$, $\Delta b$. The partial derivatives $\partial L/\partial c$, $\partial a/\partial c$, $\partial b/\partial c$ can then be estimated 714 as:

$$\frac{\partial L}{\partial c} \approx \frac{\Delta L}{\Delta c}, \frac{\partial a}{\partial c} \approx \frac{\Delta a}{\Delta c}, \frac{\partial b}{\partial c} \approx \frac{\Delta b}{\Delta c}.$$

Partial derivatives related to the other colorants can be similarly estimated by perturbing $m_0$, $y_0$, $k_0$ with $\Delta_m$, $\Delta_y$, and $\Delta_k$ in a manner similar to the perturbation of $c_0$ with $\Delta c$ described above. The perturbations ($\Delta c$, $\Delta m$, $\Delta y$, $\Delta k$) can be positive or negative and can be suitably chosen, for example, to avoid gamut boundaries (i.e., colorant values that are beyond the capability of the color producing system).

As a matter of convenience, such partial derivatives or estimates 714 thereof can be arranged in what is known as a Jacobian matrix or Jacobian J, wherein:

$$J = \begin{bmatrix} \frac{\partial L}{\partial c} & \frac{\partial L}{\partial m} & \frac{\partial L}{\partial y} & \frac{\partial L}{\partial k} \\ \frac{\partial a}{\partial c} & \frac{\partial a}{\partial m} & \frac{\partial a}{\partial y} & \frac{\partial a}{\partial k} \\ \frac{\partial b}{\partial c} & \frac{\partial b}{\partial m} & \frac{\partial b}{\partial y} & \frac{\partial b}{\partial k} \end{bmatrix}.$$

While Jacobian matrices are used to organize partial derivatives in many fields, as defined hereinabove, the Jacobain J relates aspects of a color difference to colorant differences. For instance, a color difference dL, da, db associated with a colorant difference dc, dm, dy, dk can be found from:

$$\begin{bmatrix} dL \\ da \\ db \end{bmatrix} = J \cdot \begin{bmatrix} dc \\ dm \\ dy \\ dk \end{bmatrix}$$

However, according to the embodiments of FIG. 6, there is a need to calculate a colorant difference from a determined 622 color difference. To do this, we need an inverted form of the Jacobian J. Such a transformation 626 of a color difference into a colorant difference is denoted as:

$$\begin{bmatrix} dc \\ dm \\ dy \\ dk \end{bmatrix} = S \cdot \begin{bmatrix} dL \\ da \\ db \end{bmatrix},$$

where S is the inverse of J.

While the Jacobian J can be unambiguously calculated, there are multiple solutions to inverting J, since in our application, J is typically not a square matrix. For example, in printing applications, J is typically not a square matrix because the number of colorants (e.g., 4) is usually greater than the number of parameters or color dimensions in the machine independent color space (e.g., 3). Of the multiple solutions to inverting J, the preferred solutions are those in which the relationships between the colorant values are close to the relationships that exist in the initial or original spot color emulation recipe. Those solutions to the inversion of the Jacobian in which relationships between the colorant values are not close to the relationships that exist in the original recipe will yield the desired color but they may differ from the original recipe in other attributes, such as smoothness, stability, etc. The preferred solutions can be found by imposing suitable constraints, or some form of selection criteria, on the inversion process. For instance, a cost function can be used to evaluate or select from among the various solutions to the Jacobian inversion. The selection is made by minimizing a "cost". That is, a cost function is minimized For example, in some embodiments, the cost function that is minimized is a change, relative to the initial spot color emulation colorant recipe, in the ratio of a function of one or more colorants to at least one of the remaining colorants. For instance, this cost function can be minimized through a search and select method. For example, a search is performed for all possible colorant differences (dc, dm, dy, dk) that give the desired color difference (dL, da, db). Many numerical search methods are known that can be applied to this task. For example, the so-called Steepest Descent method, conjugate Gradient algorithm and Quasi-Newton methods can be used. Furthermore, a brute-force search method, which searches a grid of all possible (dc, dm, dy, dk) around the initial spot color emulation colorant recipe $c_0$, $m_0$, $Y_0$, $k_0$, checks if they give the desired color difference (dL, da, db) and identifies all (dc, dm, dy, dk) that give the desired color difference.

Once all possible solutions are determined, one can be selected based on a variety of constraints or criteria. As indicated above, a constraint that can be applied is one that preserves relationships between colorant values. For instance, after finding all possible solutions, a colorant ratio change $\delta R$ for each solution can be found. One example of a colorant ratio change is given by:

$$\delta R = \left| \frac{\min(c_0 + dc, m_0 + dm, y_0 + dy)}{k_0 + dk} - \frac{\min(c_0, m_0, y_0)}{k_0} \right|$$

When $k_0$ is greater than a threshold value $\eta$, the solution that minimizes $\delta R$ identifies the selected solution to the inversion of the Jacobian and can be selected as the determined 314 colorant difference. To avoid numerical instabilities, when $k_0$ is less than or equal to $\eta$, the solution that minimizes dk identifies the selected solution.

The numerical methods described above can be computationally complex and therefore expensive. However, by loosening these constraints a little, analytical inversion methods are possible, enabling significant computational simplification.

For example, in some embodiments, a minimal Euclidian distance criterion is applied. The minimal Euclidian distance criterion minimizes a sum of changes (relative to the initial spot color emulation colorant recipe) in amounts of all the colorants (e.g., $dc^2+dm^2+dy^2+dk^2$). By minimizing the sum of changes in colorants, the relationships between the colorant values are approximately preserved, for small changes in printer characteristics.

Under this criterion, the inversion of J reduces to a well-known analytical matrix inversion called pseudo-inverse.

That is, S, the inverse of J, is given by $S=(J^tJ)^{-1}J^t$ where $J^t$ is the transpose of J, $J^tJ$ is a non-singular (e.g., 4×4) matrix, and $(J^tJ)^{-1}$ refers to the standard matrix inversion of the square matrix $J^tJ$.

In some embodiments, the cost function that is minimized is the amount of change in a selected colorant. That is, such a colorant preserving criterion preserves the use of one of the colorants (typically black (k)) called for in the original or initial spot color emulation colorant recipe (e.g., $k_1=k_0$). For small changes in printer characteristics, keeping one of the colorants at a constant value (or nearly constant value), approximately preserves the relationships between the colorant values. With zero change in one of the colorants, the Jacobian is given by a 3×3 sub-matrix. For example, with black (k) preserved, the sub-matrix becomes:

$$J_1 = \begin{bmatrix} \frac{\partial L}{\partial c} & \frac{\partial L}{\partial m} & \frac{\partial L}{\partial y} \\ \frac{\partial a}{\partial c} & \frac{\partial a}{\partial m} & \frac{\partial a}{\partial y} \\ \frac{\partial b}{\partial c} & \frac{\partial b}{\partial m} & \frac{\partial b}{\partial y} \end{bmatrix}$$

Since $J_1$ is a square matrix, its inverse $S_1 = J_1^{-1}$ can be readily calculated analytically using standard matrix inversion. Once $S_1$ is determined, color differences can be converted to colorant differences using, for example, $$\begin{bmatrix} dc \\ dm \\ dy \end{bmatrix} = S_1 \cdot \begin{bmatrix} dL \\ da \\ db \end{bmatrix}.$$

When applying the k preserving constraint as discussed above, there may not always be a solution, since in some cases the sub-matrix may be singular (i.e., no inverse exists). Physically, this corresponds to solutions that are out of gamut. In such cases, an inverse may be found by setting $k_1=k_0+\Delta k$ rather than $k_1=k_0$. $\Delta k$ may be positive or negative. The smallest possible value of $\Delta k$ which permits the inversion should be used, and this can be determined by, for example, an iterative process.

In some embodiments, colorant preservation is extended or applied to other colorants (e.g., cyan (c)-preserving). However, k-preserving solutions are more likely to exist, since use of k can often be replaced with the use of c, m, and y.

Since color producing systems are typically nonlinear, it may be necessary to iteratively determine the Jacobian and update the calculation.

Figure 8:
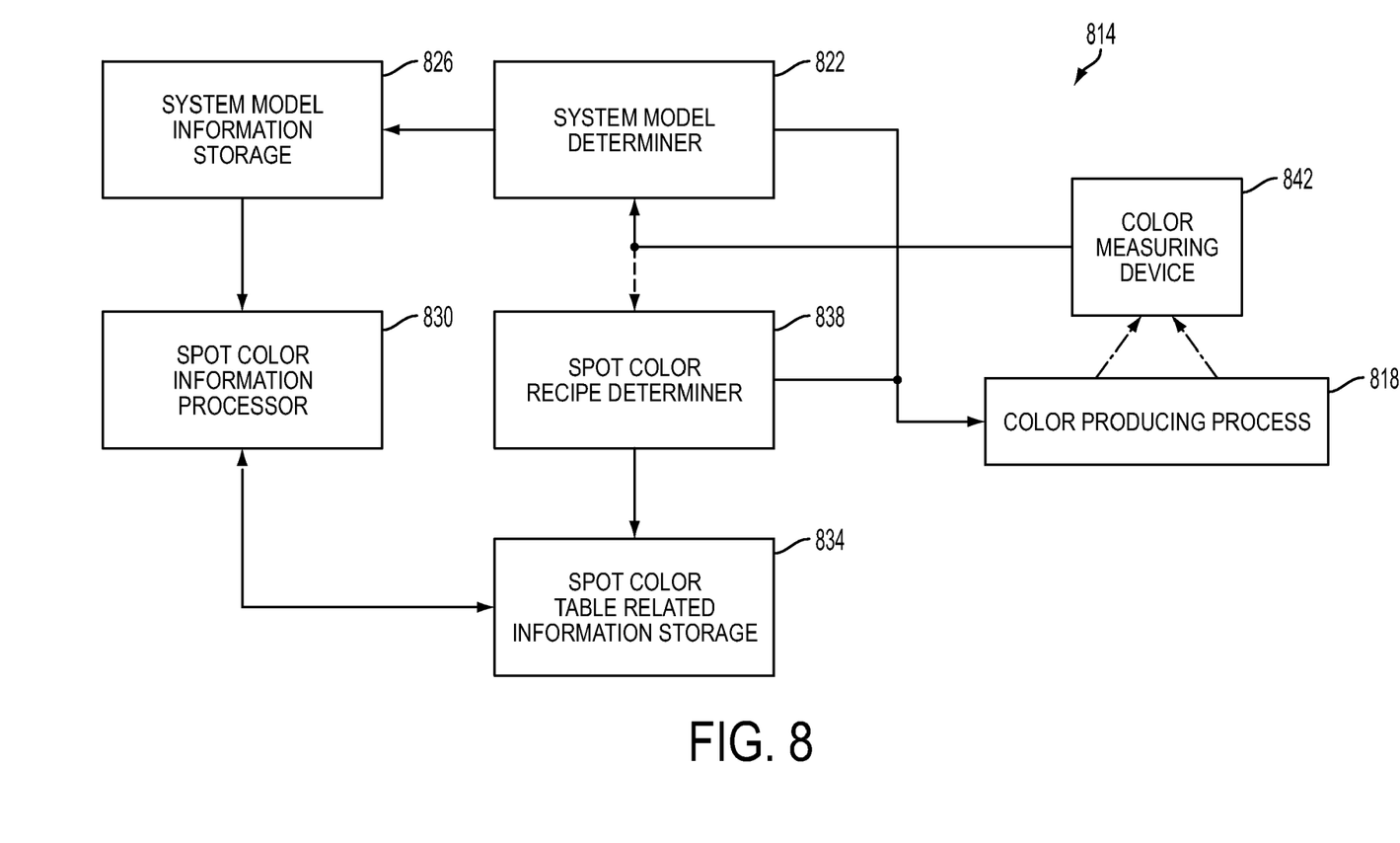
FIG. 8 is a block diagram of a spot color emulation colorant recipe compensation system in association with a color producing process.

Referring to FIG. 8, an illustrative system 814, such as an image or document processing system that can operate to compensate a spot color emulation colorant recipe according to embodiments of the method 104 for compensating a spot color emulation colorant recipe for changes in an associated color producing process 818 can include a system model determiner 822, a system model information storage device or system 826, a spot color information processor 830 and a spot color table information storage device or system 834. The system 814 may also include a spot color recipe determiner 838. The system model determiner 822 and optionally, the spot color recipe determiner 838 may communicate with a color measuring device 842, such as a spectrophotometer, that is situated to measure colors produced by the color producing process 818.

The color producing process 818 may be any known or future developed color producing process such as, for example, systems including display devices and printing systems or marking engines. For instance, the color producing process can comprise a printer, digital copier, book making machine, facsimile machine, multi-function machine or display device that uses combinations of colorants (e.g., inks or toners) or color producing elements (e.g., phosphors, LEDs) to emulate colors. Such devices include image paths for receiving and manipulating image data and controlling color producing elements to render images and/or colors.

The elements 822-838, 842 of the system 814 can be implemented in various combinations of hardware and software. Software elements can be run by computational elements such as microprocessors, microcontrollers, digital signal processors and other computing devices. The various elements can communicate with each other via any known communications means including electrical interconnections, computer networks and buses, shared memory and optical and network interconnections.

The system model determiner 822 can be operative to determine 122 the first system model of the system 818 at a first point in time and store information related thereto including, for example, parameters of the system model or look up tables representative thereof, in the system model information storage device or system 826. Additionally, or alternatively, the system model determiner may store output of the first system model in the system model information storage device 826. The system model determiner may also be operative to determine 116 the second system model of the system 818 at a second point in time and store a description of the model and/or output thereof in the system model information storage device or system 826.

For instance, the system models are determined automatically or upon system operator request. The system model determiner requests that particular colors be produced by the color producing process 818. For instance, color patches are printed or displayed according to recipes of the request of the system model determiner. Such patches are measured by the color measuring device 842 so that a correlation of inputs to the color producing process 818 and outputs from the color producing process 818 can be determined. The system model determiner 822 uses such information to determine 112 the first system model from such a process that occurs at or near the first point in time and uses such information generated by such a process at a second point in time to determine 116 the second system model.

Beneficially, the determinations 112, 116 of the first and second system models can be associated with ordinary process color calibrations, allowing the spot color table related information 834 to be updated or compensated without requiring a special spot color calibration process. This saves both time and color producing process 818 consumables (e.g., paper, ink).

The spot color recipe determiner 838 may or may not take advantage of information from the color measuring device 842. An initial spot color recipe may be determined 108 by or with the services of the spot color recipe determiner 838 through a special spot color calibration procedure.

However, according to the method 104 and the system 814, subsequent compensations or updates of that spot color emulation colorant recipe are achieved while avoiding the procedures associated with the initial spot color emulation colorant recipe determination 108.

The spot color recipe determiner 838 can determine 108 the initial spot color emulation colorant recipe be rendered or produced by the color producing process 818 according to a first estimate of the appropriate colorant recipe. The rendered spot color is then evaluated, either automatically or by a system operator, and if necessary, adjustments are made to the recipe to drive it closer to an appropriate recipe. For instance, the spot color recipe determiner 838 may receive color measurement information from the color measuring device 842, compare that measurement information with a spot color definition and adjust colorant values in a trial recipe in a manner that is likely to reduce a difference between the definition and the measured color. Another rendering of the spot color is requested of the color producing process 818 based on the adjusted trial recipe and another measurement is made by the color measuring device 842. The process is repeated until the spot color definition and the color reported by the color measurement device 842 match, are within an acceptable tolerance of one another, or no further improvement is made. At that point, the best trial recipe used is determined 108 to be the initial spot color emulation colorant recipe.

Alternatively, a system operator may enter or select a first estimate of the spot color emulation colorant recipe through an operator input device, such as a keyboard, mouse, touch screen or similar device (not shown) that is part of, associated with or in communication with the spot color recipe determiner 838. Again, the spot color recipe determiner 838 requests that a sample patch of the color be produced by the color producing process 818. The produced color is evaluated either by visual inspection or through the use of online or offline instruments by the system operator and, if necessary, the system operator communicates with the spot color recipe determiner 838 to make adjustments to the recipe according to the knowledge and experience of the operator. This process is repeated until the operator is satisfied that the spot color is appropriate. At this point, the system operator indicates to the spot color recipe determiner that the current recipe is appropriate and the current recipe is determined 108 to be the initial spot color emulation colorant recipe.

By whichever mechanism the spot color recipe determiner 838 determines 108 the initial spot color emulation colorant recipe, at the first point in time, it is stored in the spot color table related information storage device or system 834. For example, the recipe 418 is stored in association with identifying information 410 that can be used to access or recall the recipe. In some applications, the recipe 418 is also stored in association with a definition 414, and/or a color (not shown) originally predicted by the first system model to be produced by the system based on the recipe.

At some second point in time, for example, when it has been observed or estimated that aspects of the color producing process 818 have changed or drifted from where they were at the first point in time, when the system model determiner 822 was used to determine 112 the first system model and when the spot color recipe determiner 838 was used to determine 108 the initial spot color emulation colorant recipe, the system model determiner 822 can be used to determine 116 the second system model for, or of, the color producing system 818 at the second point in time, as described above.

Once the first and second models have been determined 112, 116 and information therefrom is stored in the system model information storage 826, or is otherwise available, the spot color information processor 830 can process at least one of the initial spot color emulation colorant recipe (e.g., 418) or the spot color definition (e.g., 414) according to information included in both the first system model and the second system model. The spot color information processor 830 is operative to perform this processing to generate an updated spot color emulation recipe.

For example, the spot color information processor 830 may be operative to generate 214 a second system profile that relates colors described by values in the device independent color space to colorant recipes that can be used to produce colors described by the values in the device independent color space by, or with, the color producing system 818 at the second point in time. The spot color information processor 830 may be further operative to process 218 the initial spot color emulation colorant recipe, which it may receive from the spot color table related information storage device or system 834, through the first system model determined 112 by the system model determiner 822, thereby generating a first device independent color description of a first color predicted by the first system model as it would have been generated at the first point in time by the color producing system 818 based on the initial spot color emulation colorant recipe.

The spot color information processor 830 may then process 222 the first device independent color description through the second system profile, thereby generating the compensated spot color emulation colorant recipe (e.g., 442).

As indicated above, if initial spot color recipes are determined (e.g., through the use of the spot color recipe determiner 838) without regard to or according to different colorant selection strategies than are used by the color producing process 818 for the selection of colorant recipes for process colors generally, then operating according to the process described above (i.e., 214, 218, 222) can lead to the generation of updated spot color emulation colorant recipes that are significantly different from the initial spot color emulation colorant recipes. Although the two recipes may produce the same color, they may differ in other important characteristics such as graininess, mottle, metamerism, cost as well as others. Accordingly, embodiments of the spot color information processor 830 may additionally, or alternatively, process spot color information according to other techniques.

For example, the spot color information processor may operate in a mode wherein it determines 314 a colorant difference (e.g., 438) based on the definition (e.g., 414) of the spot color, the first system model and the second system model and then combine 318 that colorant difference with the determined 108 initial spot color emulation colorant recipe 418, thereby generating the compensated spot color emulation recipe (e.g., 442).

As indicated above, there are a number of ways to determine 314 a colorant difference based on the definition of a spot color and first and second system models. Accordingly, embodiments of the spot color information processor 830 may be operative to determine the colorant difference in one or more ways.

For instance, the spot color information processor 830 may, as described above, generate 514 a first system profile that relates colors described by values in a device independent color space to colorant recipes that can be used to produce colors described by the values in the device independent color space by the color producing system 818 at the first point in time. The spot color information processor 830 may then process 518 the spot color definition (e.g., 414) through the first system profile, thereby generating a first colorant recipe. The spot color information processor 830 may then generate a second system profile that relates colors described by values in the device independent color space to colorant recipes that can be used to produce colors described by the values in the device independent color space by the color producing system 818 at the second point in time. The spot color definition (e.g., 414) can then be processed 524 through the second system profile by the spot color information processor 830, thereby generating a second colorant recipe. A difference can then be determined 530 by the spot color information processor 830, between the first colorant recipe and the second colorant recipe, thereby determining the colorant difference (e.g., 438).

Additionally, or alternatively, the spot color information processor 830 may determine 314 the colorant difference by processing 614 the initial spot color emulation colorant recipe (e.g., 418) through the first system model, thereby generating a first device independent color description of a color predicted to be produced by the color producing system (e.g., 818) at the first point in time based on or according to that initial spot color emulation colorant recipe. The spot color information processor 830 may also process the initial spot color emulation colorant recipe (e.g., 418) through the second system model, thereby generating a second device independent color description, the second device independent color description being of a color predicted to be produced by the color producing system (e.g., 818) at the second point in time based on the initial spot color emulation colorant recipe (e.g., 418). A difference may then be determined 622, by the spot color information processor 830, between the first device independent color description and the second device independent color description thereby generating a color difference (e.g., 434). The spot color information processor 830 can then transform 626 the color difference into the colorant difference that is to be determined 314.

As indicated above, the spot color information processor 830 can be operative to transform 626 the color difference into the colorant difference by estimating 714 partial derivatives of aspects of the second system model, the partial derivatives being obtained through a use of the second system model at and/or near a point in the machine dependent color space associated with the initial spot color emulation colorant recipe. The estimated partial derivatives describe changes in respective colorant amounts required to produce related changes in parameter values of the machine independent color space. Because the partial derivatives are of aspects of the second system model, the partial derivatives describe changes in colorant amounts related to changes in parameter values according to the operation of the color producing system as characterized by the second model. Once the spot color information processor 830 has estimated 714 the partial derivatives, it may multiply 718 parameter values of the color difference by respective ones of the partial derivatives. Such a multiplication 718 transforms the color difference into the colorant difference that is to be determined 314. For example, the partial derivatives may be estimated 714 as described above with regard to the determination of a Jacobian matrix and the inversion thereof.

As indicated in FIG. 8, the spot color information processor 830 receives information regarding the first and second system models from the system model information storage 826. Such information may include coefficients and offsets that describe the models, information from look up tables that represent the models and/or the results of processing information through the models. The spot color information processor 830 is also in communication with the spot color table related information storage device or system 834. As indicated above, information exchanged between the spot color table related information storage 834 and the spot color information processor 830 may include spot color emulation colorant recipes (e.g., 418), spot color definitions (e.g., 414), compensated spot color recipes (e.g., 442) and/or compensating colorant differences (e.g., 438). Information received from or generated from information received from the system model information storage 826 can include colors (not shown) predicted to be produced by the color producing process by the first and/or second models according to the spot color emulation recipes and/or compensated versions thereof. From this information, and the first and second models from the system model information storage 826, the spot color information processor 830 may generate either the compensated spot color recipe 442, or the compensating colorant differences 438.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for compensating a spot color emulation colorant recipe for emulating a spot color in output of an associated color producing system, the spot color being associated with at least one of a spot color definition in terms of a machine independent color space and an initial spot color emulation colorant recipe in terms of a machine dependent color space of the color producing system, the compensation being for changes in the associated color producing system, the method comprising:

determining the initial spot color emulation colorant recipe at a first point in time;

determining a first system model for the associated color producing system, wherein the first system model relates colorant recipes to values in the device independent color space according to the operation of the color producing system at the first point in time;

determining a second system model for the associated color producing system, wherein the second system model relates colorant recipes to values in the device independent color space according to the operation of the color producing system at a second point in time;

processing at least one of the spot color definition and the initial spot color emulation colorant recipe according to information included in, or generated from, both the first system model and the second system model, thereby generating a compensated spot color emulation recipe; and using the compensated spot color emulation colorant recipe to render an emulation of the spot color.

2. The method of claim 1 wherein processing at least one of the spot color definition and the initial spot color emulation recipe comprises:

inverting the second system model, thereby generating a second system profile, wherein the second system profile relates colors described by values in the device independent color space to colorant recipes that can be used to produce colors described by the values in the device independent color space by the color producing system at the second point in time;

processing the initial spot color emulation colorant recipe through the first system model, thereby generating a first device independent color description of a first color predicted by the first system model to be generated at the first point in time by the color producing system based on the spot color emulation colorant recipe; and processing the first device independent color description through the second system profile, thereby generating the compensated spot color emulation colorant recipe.

3. The method of claim 1 wherein processing at least one of the spot color definition and the initial spot color emulation colorant recipe comprises:

inverting the first system model, thereby generating a first system profile, wherein the first system profile relates colors described by values in the device independent color space to colorant recipes that can be used to produce colors described by the values in the device independent color space by the color producing system at the first point in time;

processing the spot color definition through the first system profile, thereby generating a first colorant recipe;

inverting the second system model, thereby generating a second system profile, wherein the second system profile relates colors described by values in the device independent color space to colorant recipes that can be used to produce colors described by the values in the device independent color space by the color producing system at the second point in time;

processing the spot color definition through the second system profile, thereby generating a second colorant recipe;

determining a colorant difference to be a difference between the first colorant recipe and the second colorant recipe; and combining the colorant difference and the determined colorant recipe, thereby generating the compensated spot color emulation colorant recipe.

4. The method of claim 1 wherein processing at least one of the spot color definition and the initial spot color emulation colorant recipe comprises:

processing the initial spot color emulation colorant recipe through the first system model, thereby generating a first device independent color description of a first color predicted by the first system model to be generated at the first point in time by the color producing system based on the spot color emulation colorant recipe;

processing the initial spot color emulation colorant recipe through the second system model, thereby generating a second device independent color description of a second color predicted by the second system model to be generated at the second point in time by the color producing system based on the spot color emulation colorant recipe;

determining a difference between the first device independent color description and the second device independent color description, thereby generating a color difference;

transforming the color difference into a colorant difference; and combining the colorant difference and the determined colorant recipe, thereby generating the compensated spot color emulation colorant recipe.

5. The method of claim 4 wherein transforming the color difference into a colorant difference comprises:

estimating partial derivatives of aspects of the second system model, the partial derivatives being obtained through a use of the second system model at and near a point in the machine dependent color space associated with the initial spot color emulation colorant recipe, wherein the estimated partial derivatives describe changes in respective colorant amounts required to produce related changes in parameter values of the machine independent color space, according to the operation of the color producing system as characterized by the second model; and multiplying parameter values of the color difference by respective ones of the partial derivatives, thereby transforming the color difference into the colorant difference.

6. The method of claim 5 wherein estimating the partial derivatives comprises:

processing a plurality of changes from the initial spot color emulation colorant recipe through the second system model, thereby generating respective sets of predicted values for parameters in the device independent color space attributable to the plurality of changes, wherein the changes comprise, for each colorant included in the spot color emulation colorant recipe, varying the colorant amount from the amount of the colorant called for in the spot color emulation colorant recipe while holding amounts of the other colorants to be the same as called for in the spot color emulation colorant recipe;

determining changes in the parameter values caused by the changes from the spot color emulation colorant recipe;

defining a Jacobian matrix based on the determined changes wherein each element of the matrix describes a respective partial derivative of a parameter in the device independent color space with respect to a respective colorant for which a colorant amount is specified in the initial spot color emulation colorant recipe; and inverting the Jacobian matrix, wherein the inversion provides the estimate of the partial derivatives.

7. The method of claim 6 wherein inverting the Jacobian matrix comprises:

selecting from among a plurality of solutions for inverting the Jacobian matrix based on a selection criteria.

8. The method of claim 7 wherein the selecting comprises: selecting a solution that minimizes at least one cost function.

9. The method of claim 8 wherein the at least one cost function to be minimized comprises at least one of: a sum of changes, relative to the initial spot color emulation colorant recipe, in amounts of all the colorants; a change, relative to the initial spot color emulation colorant recipe, in the amount of at least one of the colorants; and a change, relative to the initial spot color emulation colorant recipe, in the ratio of the minimum of one or more colorants to at least one of the remaining colorants.

10. A spot color recipe compensation system that operates to compensate a spot color emulation colorant recipe for emulating a spot color in output of an associated color producing system, the spot color being associated with at least one of a spot color definition in terms of a machine independent color space and an initial spot color emulation colorant recipe in terms of a machine dependent color space of the color producing system, the compensation being for changes in the associated color producing system, the system comprising:

a spot color recipe determiner that operates to determine the initial spot color emulation colorant recipe at a first point in time;

a system model determiner that operates to determine a first system model for the associated color producing system, wherein the first system model relates colorant recipes to values in the device independent color space according to the operation of the color producing system at the first point in time and operates to determine a second system model for the associated color producing system, wherein the second system model relates colorant recipes to values in the device independent color space according to the operation of the color producing system at a second point in time;

a spot color information processor that operates to process at least one of the spot color definition and the initial spot color emulation colorant recipe according to information included in, or generated from, both the first system model and the second system model, thereby generating a compensated spot color emulation recipe; and a rendering device of the color producing process that operates to use the compensated spot color emulation colorant recipe to render an emulation of the spot color.

11. The system of claim 10 wherein the spot color information processor operates to process at least one of the spot color definition and the initial spot color emulation recipe by:

inverting the second system model, thereby generating a second system profile, wherein the second system profile relates colors described by values in the device independent color space to colorant recipes that can be used to produce colors described by the values in the device independent color space by the color producing system at the second point in time;

processing the initial spot color emulation colorant recipe through the first system model, thereby generating a first device independent color description of a first color predicted by the first system model to be generated at the first point in time by the color producing system based on the spot color emulation colorant recipe; and processing the first device independent color description through the second system profile, thereby generating the compensated spot color emulation colorant recipe.

12. The system of claim 10 wherein the spot color information processor operates to process at least one of the spot color definition and the initial spot color emulation colorant recipe by:

inverting the first system model, thereby generating a first system profile, wherein the first system profile relates colors described by values in the device independent color space to colorant recipes that can be used to produce colors described by the values in the device independent color space by the color producing system at the first point in time;

processing the spot color definition through the first system profile, thereby generating a first colorant recipe;

inverting the second system model, thereby generating a second system profile, wherein the second system profile relates colors described by values in the device independent color space to colorant recipes that can be used to produce colors described by the values in the device independent color space by the color producing system at the second point in time;

processing the spot color definition through the second system profile, thereby generating a second colorant recipe;

determining a colorant difference to be a difference between the first colorant recipe and the second colorant recipe; and combining the colorant difference and the determined colorant recipe, thereby generating the compensated spot color emulation colorant recipe.

13. The system of claim 10 wherein the spot color information processor operates to process at least one of the spot color definition and the initial spot color emulation colorant recipe by:

processing the initial spot color emulation colorant recipe through the first system model, thereby generating a first device independent color description of a first color predicted by the first system model to be generated at the first point in time by the color producing system based on the spot color emulation colorant recipe;

processing the initial spot color emulation colorant recipe through the second system model, thereby generating a second device independent color description of a second color predicted by the second system model to be generated at the second point in time by the color producing system based on the spot color emulation colorant recipe;

determining a difference between the first device independent color description and the second device independent color description, thereby generating a color difference;

transforming the color difference into a colorant difference; and combining the colorant difference and the determined colorant recipe, thereby generating the compensated spot color emulation colorant recipe.

14. The system of claim 13 wherein the spot color information processor transforms the color difference into a colorant difference by:

estimating partial derivatives of aspects of the second system model, the partial derivatives being obtained through a use of the second system model at and near a point in the machine dependent color space associated with the initial spot color emulation colorant recipe, wherein the estimated partial derivatives describe changes in respective colorant amounts required to produce related changes in parameter values of the machine independent color space, according to the operation of the color producing system as characterized by the second model; and multiplying parameter values of the color difference by respective ones of the partial derivatives, thereby transforming the color difference into the colorant difference.

15. The system of claim 14 wherein the spot color information processor estimates the partial derivatives by:

processing a plurality of changes from the initial spot color emulation colorant recipe through the second system model, thereby generating respective sets of predicted values for parameters in the device independent color space attributable to the plurality of changes, wherein the changes comprise, for each colorant included in the spot color emulation colorant recipe, varying the colorant amount from the amount of the colorant called for in the spot color emulation colorant recipe while holding amounts of the other colorants to be the same as called for in the spot color emulation colorant recipe;

determining changes in the parameter values caused by the changes from the spot color emulation colorant recipe;

defining a Jacobian matrix based on the determined changes wherein each element of the matrix describes a respective partial derivative of a parameter in the device independent color space with respect to a respective colorant for which a colorant amount is specified in the initial spot color emulation colorant recipe; and inverting the Jacobian matrix, wherein the inversion provides the estimate of the partial derivatives.

16. The system of claim 15 wherein the spot color information processor inverts the Jacobian matrix by:

selecting from among a plurality of solutions for inverting the Jacobian matrix based on a selection criteria.

17. The system of claim 16 wherein the spot color information processor selects a solution that minimizes at least one cost function.

18. The system of claim 17 wherein the spot color information processor selects a solution that minimizes at least one of: a sum of changes, relative to the initial spot color emulation colorant recipe, in amounts of all the colorants; a change, relative to the initial spot color emulation colorant recipe, in the amount of at least one of the colorants; and a change, relative to the initial spot color emulation colorant recipe, in the ratio of the minimum of one or more colorants to at least one of the remaining colorants.

* * * * *